(12) United States Patent
Ivtsenkov

(10) Patent No.: US 7,359,586 B2
(45) Date of Patent: Apr. 15, 2008

(54) FIBER OPTIC STRAIN SENSOR AND ASSOCIATED DATA ACQUISITION SYSTEM

(76) Inventor: Gennadii Ivtsenkov, 386 Rexford Drive, Hamilton (CA) L8W 3Y7

( * ) Notice: Subject to any disclaimer, the term of this patent is extended or adjusted under 35 U.S.C. 154(b) by 0 days.

(21) Appl. No.: 11/164,113

(22) Filed: Nov. 10, 2005

(65) Prior Publication Data

US 2006/0104561 A1    May 18, 2006

Related U.S. Application Data

(60) Provisional application No. 60/522,845, filed on Nov. 12, 2004.

(51) Int. Cl.
*G02B 6/00* (2006.01)
(52) U.S. Cl. .......................... 385/13; 385/12
(58) Field of Classification Search ................ 356/32, 356/33, 911, 927; 73/800; 385/11–13; 250/227.14, 250/227.17
See application file for complete search history.

(56) References Cited

U.S. PATENT DOCUMENTS

| | | | |
|---|---|---|---|
| 4,173,412 A | 11/1979 | Ramsay et al. | 356/33 |
| 4,564,289 A | 1/1986 | Spillman | 356/33 |
| 4,584,470 A | 4/1986 | Iizuka et al. | 250/231 |
| 4,773,753 A | 9/1988 | Hirose et al. | 356/35 |
| 4,920,261 A | 4/1990 | Bock et al. | 250/225 |
| 5,054,922 A | 10/1991 | Kersey | 356/345 |
| 5,297,436 A | 3/1994 | Chan et al. | 73/657 |
| 5,633,959 A | 5/1997 | Niki et al. | 385/11 |
| 5,641,955 A | 6/1997 | Bonniau et al. | 250/227 |
| 5,672,008 A * | 9/1997 | Bonniau et al. | 374/161 |
| 6,201,237 B1 | 3/2001 | Berkley et al. | 250/227.14 |
| 6,211,962 B1 * | 4/2001 | Nolan | 356/450 |
| 6,513,390 B1 | 2/2003 | De La Puente et al. | 73/800 |
| 6,563,589 B1 | 5/2003 | Bennett et al. | 356/483 |
| 6,647,800 B2 | 11/2003 | De La Puente et al. | 73/800 |
| 6,748,128 B2 * | 6/2004 | Koch et al. | 385/12 |

* cited by examiner

*Primary Examiner*—Sung Pak
*Assistant Examiner*—Daniel J Petkovsek

(57) ABSTRACT

A fiber optic polarimetric strain sensor and associated data acquisition system capable of all-optical measurements of physical parameters, such as structural strain, gas and liquid pressure, acceleration and vibration, gas and liquid flow rate, and force without fire and explosion hazards associated with conventional strain gage technologies, such as resistance foil strain gages. The polarimetric strain sensor houses a sensitive element—a length of single-mode optic fiber—changing polarization of a single-mode optical signal running in the fiber under some mechanical effects, specifically twisting and radial compressing. A multi-channel time division multiplexing data acquisition system indicates the polarization state deviation caused by the strain, so allow measuring the parameters. The invention may be embodied for measurements of any phenomenon that can be transformed in stress on an optical fiber.

10 Claims, 5 Drawing Sheets

FIBER OPTIC STRAIN SENSOR AND ASSOCIATED DATA ACQUISITION SYSTEM

CROSS-REFERENCE TO RELATED APPLICATIONS

This application is the corresponding non-provisional one related to the provisional application No. 60/522,845 filed Nov. 12, 2004.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATED-BY-REFERENCE OF MATERIAL SUBMITTED ON A COMPACT DISK

Not Applicable.

BACKGROUND OF THE INVENTION

1. Field of the Invention

The present invention relates to the measurement of physical parameters, such as strain, pressure, acceleration, flow rate and force by fiber optic sensor utilizing the photoelastic effect. More particularly, the invention pertains to utilize in the optic sensor specific strains of single-mode and graded-index multimode optical fiber, such as radial compression and twisting, which effectively produce the photoelastic effect. The present invention also relates to associated data acquisition systems.

2. Description of the Related Art

Fiber optic sensors successfully substitute now conventional resistance strain gages that have been the most widely used in the past, and are the most readily available technology at this time. The sensitive element of fiber optic sensors is a length of specially prepared optic fiber that alter the transmitted optical signal in a manner that can be detected and measured by optical instrumentation under a stress applied on the fiber.

This optical sensor technology has overcome many of the inherent disadvantages of resistance strain gages and its electrical transmission networks, including long-term measurement drift, sensitivity to electromagnetic interference, and dangers from electrical power requirements, which have limited their application in certain fields, such as fire and explosion hazardous environments.

Within the past two decades, a number of manufacturers have attempted to exploit this fiber optic sensor technology, with limited results. The costs and complexity associated with the electronic and optical systems required to implement the fiber optic sensors were prohibitively high for most applications. Successful development of fiber optic technology for telecommunications industry has greatly mitigated this problem.

There are three main principles that are now utilized in strain fiber-optical sensors:

Fiber Bragg grating. It is the most developed technology used for fiber-optical stress sensors. Here, the single-mode optical fiber with written Bragg grating is stretched by external force. It causes deviation of grating period that can be measured. For example, if a tensile force of 1 kg is applied to standard single-mode $9/125$ optical fiber, it will be stretched on 0.82% that shifts the light wavelength reflected from the grating on about 39 nm at 1550 nm. There are varieties of measuring technology that allow measuring such wavelength deviation. In some designs, such fiber sensors have doubled or tripled grating and utilize multi-wavelength light source to achieve more reliable measurements.

Fabry-Perot interferometer. Here, strain (tensile force) applied to the fiber stretches it. Usually, such sensors have an optic fiber with a small gap, and under a tension applied to the fiber the width of the gap are changed. So, the wavelength of the light reflected from this gap is shifted that can be precisely measured.

Scattered light sensors (Brillouin scattering). Another physical principle utilized in the strain sensors is the light scattering. Here, the strain measurement is based on a variation of scattered light produced by an incident light launched into the fiber. The strain applied to the silica fiber changes structure of the material so changes the back reflection caused by the scattering.

The review of the existed fiber optic strain sensors, its principles and designs reveals that the sensors mentioned above have some disadvantages, such as high cost and complexity of measuring equipment. In some cases, the data acquisition systems utilizing these sensors have problems with the measurement instability, temperature and polarization sensitivity (especially, interferometer-based sensors). Also, measuring system implementing fiber optic strain sensors based on Bragg grating technology requires complicated multi-line single mode light source that has to provide large number of spectral lines, or wavelength scanning light source.

Therefore, for the mass applications, such as monitoring of structural elements, pipeline pressure and flow rate, it is necessary to develop a low cost, simple design, stable in different ambient conditions and reliable fiber-optical strain sensor based on alternative approach. Also, the data acquisition system based on these sensors has to support a number of sensors and provide data compression possibility that allows using a single optical line to monitor a number of sensors.

There is another principle that a fiber-optical strain sensor could be based on. It is the photoelastic effect, phenomenon of polarization conversion of the light running in optic fiber under stress applied to the fiber. It usually appears in conventional single-mode optical fiber and creates serious problems for the newest telecommunication lines using polarization-sensitive equipment.

Generally, a conventional single-mode optical fiber can not maintain polarization of light signal running in the fiber. Some external mechanical forces, even small ones, applied to the fiber can induce a birefringence in the fiber core so converting input polarization. For example, if a radial pressure is applied on the portion of the fiber, it produces a linear birefringence there with its slow axis in the direction of applied pressure. The retardation between the slow and fast axes can be varied from 0 to $2\pi$ by changing of applied pressure. Therefore, a strain appearing in the fiber core under external mechanical forces applied on the fiber produces a kind of variable size retardation plate (depends on applied force) that converts light polarization. Such retardation plate induced in the fiber core can work as $\frac{1}{2}$, $\frac{1}{4}$-wavelength plate or its combination rotating polarization plane of input light, transforming linearly polarized light into elliptical one and vise-versa. This deviation of the light polarization can be measured using a polarization analyzer. The intensity of the light sequentially passed through the polarizer & analyzer system can be calculated according to the formula:

$$I = I_o \cos^2 \phi,$$

Where Io—is the amplitude of input light,
ϕ—is the angle between polarizer and analyzer polarization planes.

Therefore, if angles of the analyzer and input light polarization planes are aligned, and there is no stress applied on the fiber, the light passes the analyzer without attenuation (I=Io). When the stress is applied, the angle of polarization plane of the light running in the fiber turns, so intensity of the light passed the analyzer declines (I<Io). Thus, variation of the stress produces amplitude modulation of the output signal that can be utilized for the strain measurement.

This effect is used in a fiber Babinet-Soleil polarization compensator developed for fiber-optical telecommunication lines. It contains a piece of bare single-mode optical fiber and squeezer, the mechanism that can be tightened and rotated about the fiber so converting any input polarization into desired one. The device, despite its simplicity, is very reliable and keeps this conversion for a long time without deviation.

General idea of utilization of this effect for strain measurements was claimed, particularly, in U.S. Pat. No. 4,173,412 granted to M. Ramsay and S. H. Wright, and U.S. Pat. No. 4,564,289 issued Jan. 14, 1986 to Spillman, however, it should be noted that the optic sensor suggested by the patent author does not specify the stress that has to be applied to a single mode optic fiber to produce high birefringent effect. In the preferred embodiment of U.S. Pat. No. 4,564,289, the author utilizes an axial stretching of the fiber—the strain that is suitable for the Bragg grating sensors, but does not produce high birefringent effect. Moreover, in the preferred embodiment shown on FIG. 1 of U.S. Pat. No. 4,564,289, the circular polarized light, which is proposed by the author to feed the sensor, and elliptical polarized light carrying the information about the strain (line 105 and 106 on FIG. 1 of the patent) can not be properly transmitted neither by conventional single mode fiber-optical line, nor by polarization-maintaining fiber line without polarization distortion. Also, light emitting diode proposed in U.S. Pat. No. 4,564,289 can not be properly matched with single mode fiber, and multi-wavelength light, also proposed there, causes different polarization variation for each wavelength so making measurement less reliable. And, the idea to use an analogue differential signal developed by special sensing unit, such as differential bridge, looks obsolete, because it comes from old style electric strain gages and analogue differential amplifiers. Modern computer technology permits processing sensing and reference elements separately that allows drastically simplifying the sensor design and associated measuring system.

Theoretically, there are four possible stresses that could be applied on an optical fiber, such as axial stretching, bending, radial compressing and twisting, but only two of them—radial compressing and twisting—produce high birefringent effect.

The idea of utilization of these effects to measure a strain was proposed in U.S. Pat. No. 6,211,962 B1 issued Apr. 3, 2001 to Nolan. The author of this patent suggests a polarization-maintaining single-mode optic fiber as a sensing one. He connects lengths of such fiber in sequences, wherein each length is affected by different phenomenon, such as pressure, temperature, etc. To separate readings of each parameter, the author of mentioned above patent suggests launching a multi-wavelengths light, wherein each wavelength represents single measured parameter. To achieve amplitude modulation of the light passing the fiber, the author suggests launching two single-mode lights having orthogonal polarizations.

The experiments conducted by the author of the present invention reveal that a polarization-maintaining fiber is not the best sensing element of such sensors. Any deviation of polarization angle of a single-mode linear-polarized light running in polarization-maintaining fibers transforms the linear-polarized light into elliptical one, which amplitude is not in proportion with measured phenomenon.

According to optics, two orthogonally polarized lights can not interfere; the interference occurs in linear-polarized light only when planes of the polarization are aligned. Interaction between two orthogonally polarized lights only rotates vector E of electromagnetic wave—the effect known as elliptical or circular polarization. To transform elliptically-polarized light back into linear one the polarization compensator—quarter-wavelength plate—is used. Also, amplitude of the combined light does not change when a linear-polarized light is transformed into elliptical one. In reality, many parts of conventional single-mode fiber-optical telecommunication line is affected by some mechanical deformations, such as bending, twisting, compressing, etc., which randomly induce birefringence along the line. As the result, in long single-mode optical lines this effect many times transforms initially linear-polarized light into elliptical and back into linear one also changing its polarization angle, but these variation of polarization state does not introduce any attenuation of the output signal; only ratio between two orthogonally-polarized components is changed. Thus, to achieve any reading, it is necessary to sequentially install the quarter-wavelength retardation plate converting elliptically-polarized light back into linear one and, also, a polarization analyzer that transforms deviation of polarization angle into light amplitude modulation.

Introducing the second light with orthogonal polarization angle proposed in U.S. Pat. No. 6,211,962 B1 makes the situation more complicated, because these two running lights initially produce elliptical or circular polarization; and each component reacts differently to applied stress. The multi-wavelength light proposed in U.S. Pat. No. 6,211,962 B1 can produce complete mess, because each length of affected sensing fiber introduces birefringence that sequentially changes polarization state of the light of each wavelength passed all stages. It was mentioned in U.S. Pat. No. 6,211,962 B1, but separation of these effects proposed by the author of this patent is very problematic, even though it was mathematically treated. Also, in the case of multi-wavelength light, polarization converters—the quarter-wavelength plates—can not provide accurate conversion because of mismatching of wavelengths. Theoretically, such system can be initially aligned (zero reading), but, when measured phenomena start affecting, the system becomes completely misaligned.

The feasibility of polarization-maintaining fibers as the sensing ones was investigated by the author of the present invention. The research reveals very unreliable reading of the sensors utilizing this kind of optic fibers. Because of this, the author of the present invention refuse utilizing polarization-maintaining optic fibers as sensing ones, and use it to delivery linear-polarized light to sensing fibers only.

Unlike the polarization-maintaining fiber, conventional single-mode optic fiber provides the most reliable and stable conversion of applied stress into rotation of polarization angle of single-mode linear-polarized monochromic light that can be reliably measured. Reliability and stability of conversion has been proved by experience with fiber Babinet-Soleil polarization compensator utilizing radial compressing and twisting stresses applied on a length of conventional single-mode optic fiber.

Another kind of optic fibers that can be used in polarimetric strain sensors is graded-index multimode optic fibers. The research conducted by the author of the present invention reveals that these fibers, unlike step-index ones, can transmit single mode light with low losses and without conversion it into multi-mode one. Moreover, radial compressive or twisting stresses applied to a graded-index multimode optic fiber produce high birefringent effect similar to one induced in single-mode optic fibers.

The fiber optic sensors of the present invention utilize radial compressing and twisting stresses applied to length of a single-mode optic fiber; and when the sensor is affected by measured parameter, such as strain, pressure, acceleration, gas or liquid flow, the optic fiber realizes corresponding compressing or twisting stress so producing measurable polarization angle rotation that is in proportion with the measured parameter.

Another object of this invention, a data acquisition system collecting measurements performed by the fiber optic sensors, is based on novel schematic solutions and fiber optic polarization equipment developed for newest polarization-sensitive fiber-optical telecommunication lines. It includes all-optical time-division multiplexing units, such as MEMS photonic switch or Acousto-Optical Switch for Fiber-Optic Lines described in U.S. Pat. No. 6,539,132 issued Mar. 25, 2003 to G. Ivtsenkov at al.

OBJECT OF THE INVENTION

It is an object of the present invention to provide a high-sensitive simplified fiber optic sensor for measuring physical parameters, such as structural strain, pressure, acceleration, flow rate and force, which utilizes birefringence of single-mode or graded-index multimode optic fiber induced by applied radial compressive or twisting stresses, and associated multi-sensor all-optical data acquisition system.

SUMMARY OF THE INVENTION

The present invention alleviates the disadvantages of the prior art by utilization of specific stresses applied to the sensitive element—a single-mode optic fiber, polarization features of graded-index multimode optic fiber, mechanical transducers transforming measured parameters into specific stress of the optic fiber, and associated all-optical data acquisition system implementing the novel polarization controlling technology for fiber-optical lines. A particular features of the fiber optic sensors according to the present invention are a high sensitive element—length of single mode or graded-index multimode optic fiber transforming the specific stresses, such as radial compressing and twisting ones applied to the fiber into a deviation of polarization of single mode optical signal passing the fiber, and a mechanical transducer transforming the measured parameter into compressive or twisting stress of the optic fiber.

The method of the present invention comprises the steps of providing a linearly-polarized single mode light signal, delivering light signal to the sensor via polarization maintaining fiber-optical line, polarization analysis transforming the polarization variation of the signal caused by the stress into modulation of the light intensity, fiber-optical lines transmitting the modulated light signal to light detectors, and electric-optical unit processing the signal to measure polarization variation that is indicative of parameter. The measured parameter is, thus, determined from the sensed intensity variation.

There can be a few possible designs of such sensor that utilize fiber twisting or radial compressing—the stresses providing the highest birefringence effect—for the measurements.

The sensor and data acquisition system may be used for monitoring of structural strain, force, acceleration, vibration, pressure, flow rate or other parameters that can be transformed into stress on an optical fiber. For structural strain sensing, base of the sensor is attached to the area of interest, causing the fiber to experience the correspondent stress. For force, acceleration, vibration, pressure and flow rate sensing, the sensor is equipped with mechanical transducer transforming the measured phenomenon into specific stress of the optic fiber.

To compensate possible influence of ambient conditions that produce unwanted changes in the sensor output, a reference optic fiber being proximately located to the sensing optical fiber and a fiber-optical splitter are implemented.

The data acquisition system described in this invention can measure a number of parameters simultaneously or in time sequences. The system is completely fiber-optic one that does not contain any spatial elements, such as lenses, mirrors, plates; it is the solid and contains only two sensitive elements—the sensing and reference fibers.

The invention may be utilized in fire and explosive hazardous places, such as oil refineries, gas pipelines, munitions deports and others where electrical devices can not be used, and, also, in high electromagnetic interference environment.

THE DRAWINGS

FIG. 1 diagrammatically depicts the scheme of the invention—the data acquisition system implementing the fiber-optic sensor of the present invention.

FIG. 2 diagrammatically depicts the variant of the scheme of the invention utilizing a photonic switch.

FIG. 3 diagrammatically depicts an embodiment of the invention for sensor assembly.

DETAILED DESCRIPTION OF THE PREFERRED EMBODIMENTS OF THE INVENTION

Figure 1:
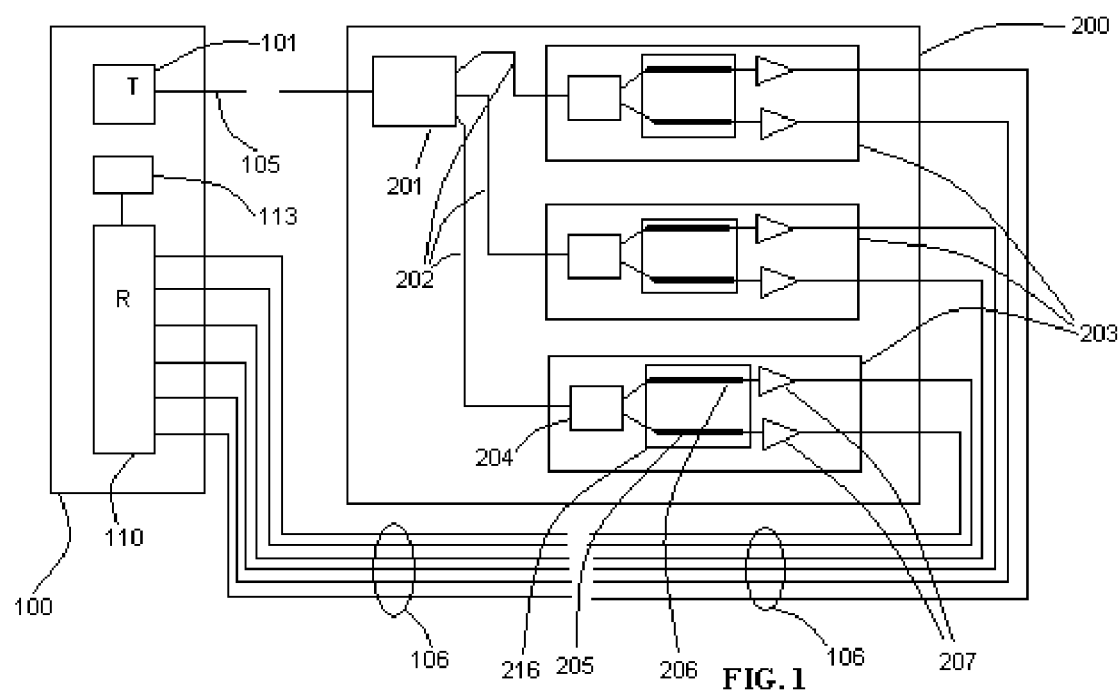

The scheme of the invention is shown in FIG. 1. An electro-optical module 100 delivers optical power to a photoelastic sensing module 200 via polarization-maintaining single mode optic fiber line 105 and converts the optical signals, which returns to the electro-optical module 100 via conventional single mode optical fiber lines 106, into electrical signals. The electro-optical module 100 contains a single-mode polarization-maintaining fiber-optical source of light 101, such as a polarization-maintaining 1310-nm (or 1550 nm) laser diode developed for telecommunication lines. The light source 101 has to provide stable single-wavelength linearly-polarized radiation. The light source 101 is optically coupled to polarization-maintaining single-mode fiber-optical line 102 in such a way that polarization planes of the emitted light and the polarization-maintaining fiber are matched. The light entering optical fiber 102 propagates along that fiber until it reaches the sensing module 200. In that module, the linearly-polarized light passes through a polarization-maintaining splitter 201 with number of outputs equal to number of sensors 203. Each output of splitter 201 is optically coupled to polarization-maintaining single mode fiber-optical lines 202 delivering the light to each individual sensor in such a way that the polarization planes of splitter 201 and polarization-maintaining fibers 202 are matched. The light further propagates along each fiber 202 until it reaches the sensors 203. Each sensor 203 contains a single polarization-maintaining splitter 204, a sensing device 216 and two fiber-optical isolators 207. The sensing device 216 contains two similar single-mode or graded index multimode optic fibers—a sensing fiber 205 and a reference fiber 206—and mechanical transducer transforming measured parameter into compressive or twisting stress applied on the sensing fiber 205. Both of the fibers have the same length and are proximately located. Thus, the sensing fiber 205 is affected by the stress, and not affected reference fiber 206 is used to compensate environmental effects, such as temperature variation. Splitter 204 has a single input, which is optically coupled to output of fiber line 202 in such a way that the polarization planes of polarization-maintaining fibers 202 and splitter 204 are matched, and two outputs. The first output of splitter 204 is optically coupled to the sensing optic fiber 205, and the second one—to the reference fiber 206. The output of each fiber 205 and 206 is optically coupled to fiber-optical isolators 207 in such a way that polarization plane of the isolators is turned against the polarization plane of the light passing the fibers without applied strain on 45 arc degrees. The outputs of isolators 207 are optically coupled to conventional single mode fiber-optical lines 106 combined in multi-channel fiber-optical cable.

The light passing through the sensing module 200 returns to the electro-optical module 100 via the fibers 106 optically coupled to photodetectors 110. The outputs of those photodetectors are then fed to a processing unit 113.

Therefore, the single mode linearly-polarized optical signal sequentially passes polarization-maintaining lines 102 and 202, polarization-maintaining splitters 201 and 204, fiber 205 or 206, isolators 207 and conventional single mode fiber-optical lines 106, and is finally transformed into electrical signal by photodetectors 110. Here, the splitter 201 splits the optical signal to feed a number of sensors 203, and splitters 204 direct light to sensing and reference fibers 205 and 206. Isolators 207 work here as polarization analyzers transforming polarization deviation into light intensity modulation. Angle of 45 arc degrees applied between polarization plane of not disturbed light and the polarization plane of the isolators 207 allows measuring a strain in both directions relatively to not disturbed condition and achieving the maximal sensitivity. The light passed the isolators 207 may randomly change its polarization state in the conventional single-mode lines 106 without affecting the data because of photodetector 110 polarization insensitivity. The sensors are calibrated, and the calibration table is loaded in processing unit 113, which calculates value of the parameter affecting each sensor 203 by processing the data received from sensing and reference fibers. This approach allows eliminating ambient effects, such as temperature instability.

OTHER EMBODIMENTS OF THE INVENTION

Scheme of the Invention Utilizing Photonic Switch

Figure 2:
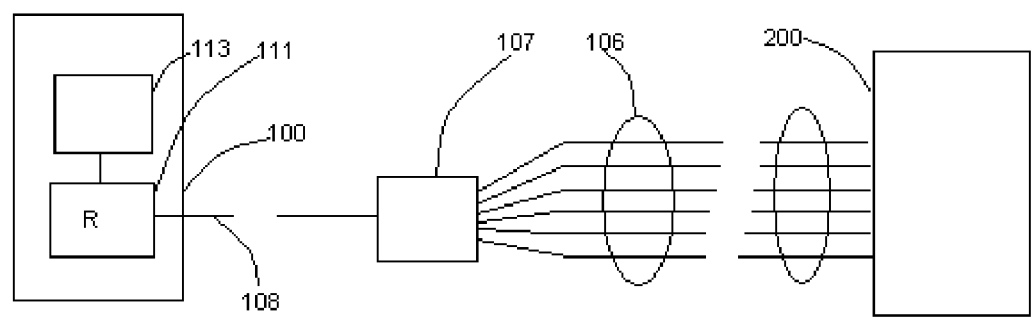

The scheme of this embodiment of the invention is shown in FIG. 2. FIG. 2 shows part of the diagram different from shown on FIG. 1. This embodiment comprises photonic switch 107, which provides to sensors sequential access to the single photodetector 111. In this embodiment single-mode fiber-optical lines 106 are optically coupled to inputs of photonic switch 107 having single output and number of inputs equal to number of fiber-optical lines 106. The switch 107 sequentially connects each output of isolators 207 to input of single fiber-optical line 108. The output of the line 108 is optically coupled to a single photodetector 111 that transforms the optic signal into electrical one, therefore the photodetector sequentially collect data coming from the sensors.

The output electrical signal produced by this photodetector further enters a processing unit 113, which processes these sequences of electrical signal and transforms it into readings of the measured parameters.

This embodiment allows transmitting data developed by sensing module 200 to electrical-optical module 100 via single fiber-optical line 108. The switch may be incorporated in sensing module 200 or placed in proximity to the module. In the case of hazardous place monitoring, the switch containing an electronic controlling unit may be placed in a safe place near the monitored site.

Here, the switch sequentially connects sensing and reference outputs of the sensors according to a switching schedule written in switch software that may reflect any monitoring requirements.

The photonic switch can be based on MEMS technology or Acoustic Optical technology (U.S. Pat. No. 6,539,132 issued Mar. 25, 2003 to G. Ivtsenkov et al.), if high speed switching is requires.

Scheme of Sensor Assembly

Figure 3:
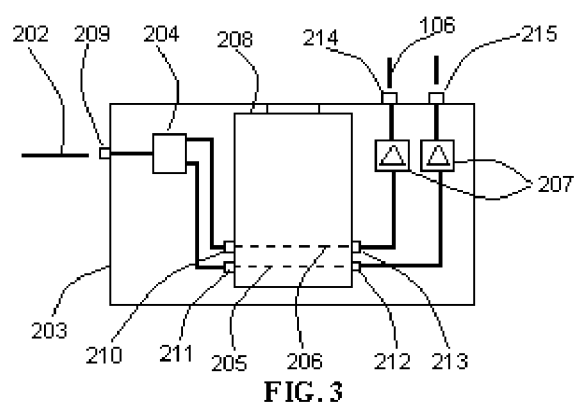

Sensor 203 can be configured as shown in FIG. 3. In this embodiment, sensor 203 incorporates sensing device 208, the unit containing specially positioned sensing and reference fibers 205 and 206, and mechanical transducer transforming measuring parameter into specific stress of sensing fiber 205. Sensor 203, also, incorporates polarization maintaining splitter 204 and two fiber-optical isolators 207. Splitter 204 splits the linear polarized optic signal coming from fiber-optical line 202 and direct it to sensing and reference fibers 205 and 206. Further, the light coming from sensing and reference fibers 205 and 206 passes fiber-optical isolators working here as polarization analyzers. The isolators introduce attenuation of passing light according to angular misalignment of polarization planes of incoming light and the isolator so providing amplitude modulation of the optical signal passed sensor 203. Input and outputs of splitter 204, inputs and outputs of fibers 205 and 206, and outputs of isolators 207 are optically coupled to fiber-optical connectors 209, 210, 211, 212, 213, 214 and 215, where connector 210 coupling splitter 204 to reference fiber 206 can axially turn optic fiber coming from splitter 204 against reference fiber 206 so initially matching polarization planes of light coming from the sensing and reference fiber in the condition when measured parameter is not applied. The output optical signals can be transmitted to electro-optical module 100 via conventional single mode fiber-optical lines 106 because photodetectors 111 of module 100 are not sensitive to light polarization.

Design of the sensing device 208 can vary and very depends on measured parameter. The designs of each sensing device dedicated to the specific parameter, such as structural strain, acceleration and vibration, pressure, flow rate and force are described in the following embodiments.

Structural Stress Sensor Embodiment

Figure 4:
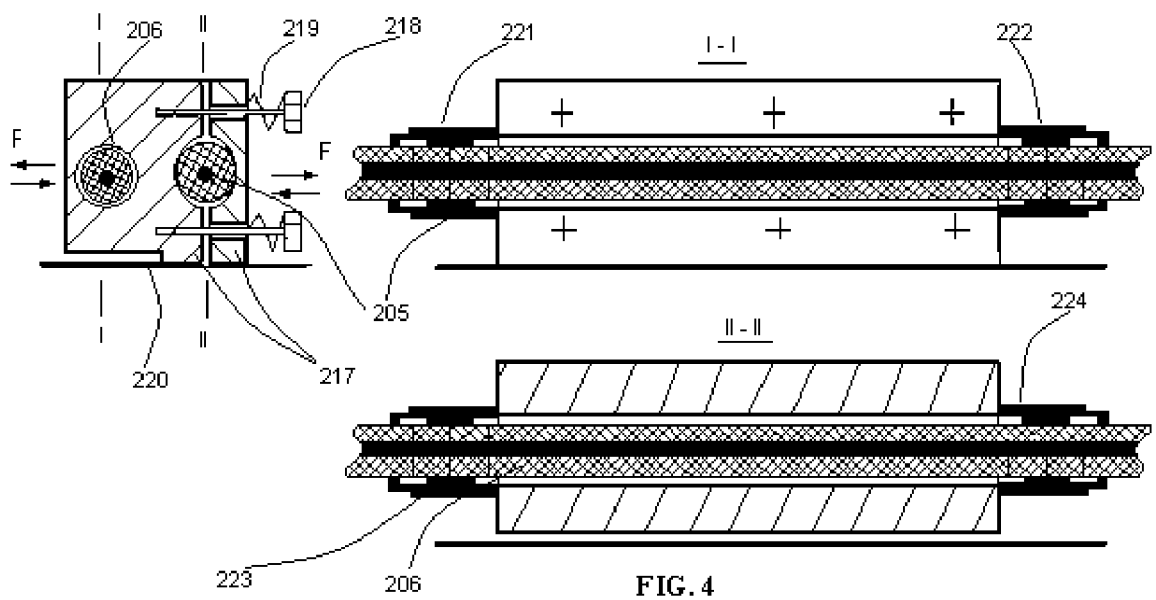
FIG. 4 depicts an embodiment of the invention for sensing and measuring structural stress.

To sense structural stresses, the sensing device can be configured as shown in FIG. 4. In this embodiment, the bare single mode or graded-index multimode fiber 205 is tightened in a miniature vise 217 by screws 218 and springs 219. The vise 217 is firmly fastened on base 220 that could be a surface of tested structure. Therefore, the springs 219 produce permanent compressive strain on the fiber 204 affecting the polarization of the light passing the fiber. Thus, sensor can work in both directions measuring tension and contraction strains. The reference fiber 206 is placed in separate pattern in the body of the vise 217 and fixed by epoxy resin or another adhesive. When the structure is stretched or contracted, force F is applied to the vise so changing the total pressure applied to the fiber 204 and, therefore, changes the polarization, while reference fiber 206 is not affected and keeps the polarization without changing. Temperature variation affect both fibers equally producing "common mode" stresses whose effects cancel out when the data is processed by processing unit 113 (FIG. 1).

Fibers 205 and 206 are optically coupled to fiber-optical connectors 221, 222, 223 and 224.

Acceleration and Vibration Sensor Embodiment

Figure 5:
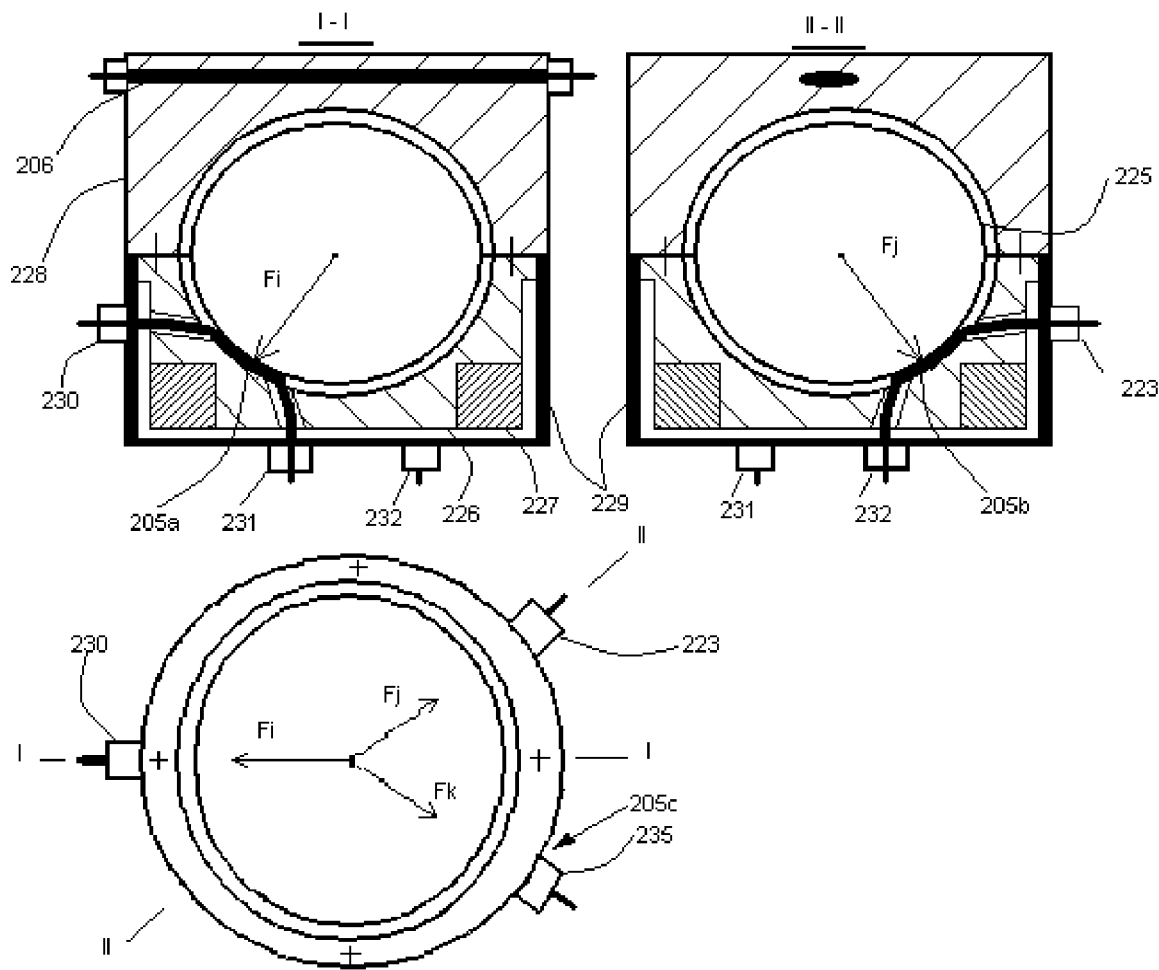
FIG. 5 depicts an embodiment of the invention for sensing and measuring 3D acceleration and vibration.

To sense acceleration and vibration, the sensing device can be configured as shown in FIG. 5. In this embodiment, the bare single-mode or graded index multimode fibers 205a, 205b and 205c are placed between ball 225 and hemispherical concave pattern machined in cylinder 226. The fibers are arranged in such a way that radii of the ball touching the middle of section of the affected fibers 205a, 205b and 205c form 3D orthogonal axis. Ball 225 is made from magnetically soft material, such as permalloy—an 80/20 alloy of nickel and iron. Cylinder 226 is made from diamagnetic material, such as brass or another diamagnetic alloy. Axially-polarized permanent ring magnet 227, axially mounted in the base of cylinder 226 attracts the ball so providing continuous pressure on fibers 205a, 205b and 205c. The magnet is ferrite or NdFeB one. The ball is covered by lid 228 having similar hemispherical concave pattern axially arranged with the first pattern. The lid is made from diamagnetic material, such as brass or any diamagnetic alloy. The lid has cylindrical cavity where reference fiber 206 is placed. Fibers 205a, 205b and 205c are optically coupled to connectors 223, 230, 231, 232 and 235 that are mounted on frame 229. Therefore, the sensor contains three sensing and one reference fibers. The sensing fibers are affected by orthogonal forces Fi, Fj and Fk produced by acceleration or vibration. Because any applied force can be decomposed on three orthogonal vectors, vectors of force Fi, Fj and Fk completely represent force caused by acceleration and vibration affecting the sensor. Thus, the sensor allows measuring value and direction of applied acceleration and vibration. The permanent pressure applied to the fibers allows measuring the acceleration in both—plus and minus—directions.

In the case, when permanent magnet is not suitable it can be substituted by a spring axially compressing ball 214.

Pressure Sensor Embodiment

Figure 6:
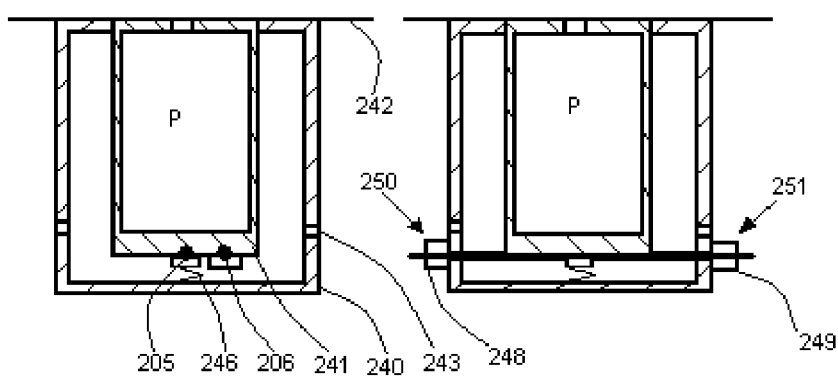
FIG. 6 depicts an embodiment of the invention for sensing and measuring pressure, where radial stress of sensing fiber is utilized.

To sense gas and liquid pressure, the invention can be embodied as depicted in FIG. 6. In this embodiment, the measured pressure is transformed into compressive strain of sensing fiber 244 by two coaxial cylindrical chambers 240 and 241, wherein chamber 241 is exposed to measured pressure and cylinder 240 has openings 243 to allow external pressure equally affecting both chambers. The bottom of cylindrical chamber 241 has two grooves where two single-mode or graded-index multimode fibers 205 and 206 are placed. Fiber 205 is permanently compressed by spring 246, and fiber 206 is placed on the bottom of chamber 241. When pressure P is applied, the chamber 241 axially elongates compressing fiber 205 and spring 246. Thus, fiber 205 experiences radial stress that change polarization of light passing the fiber. Fiber 206 is the reference fiber that not affected by the pressure and does not change the polarization. It allows subtracting ambient effects, such as temperature variation.

Figure 7:
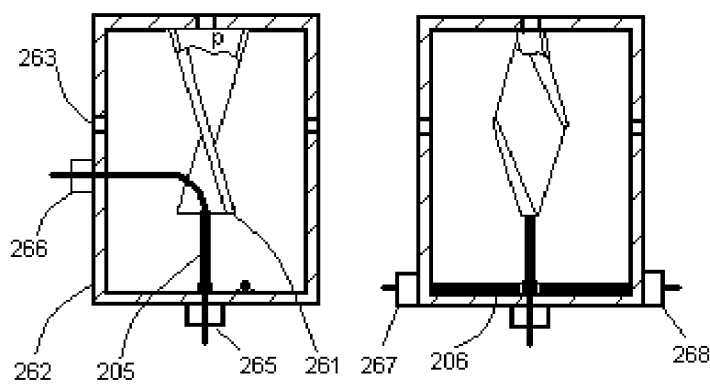
FIG. 7 depicts an embodiment of the invention for sensing and measuring pressure, where twisting stress of sensing fiber is utilized.

Another embodiment of the pressure sensor is shown on FIG. 7. In this embodiment, the measured pressure is transformed into twisting strain of sensing fiber 205 by two coaxial chambers 261 and 262. Chamber 261 is a twisted cylinder having elliptical cross section. When chamber is exposed by internal pressure P, the chamber starts twisting around its axis in the opposite direction to the initial twisting. Chamber 262, the cylinder with openings 263, is not affected by the measured pressure and not deformed. Length of sensing optic fiber 205 is axially fixed on the bottoms of twisted chamber 261 and cylinder 262. Therefore, the applied pressure twists the fiber and change polarization of light passing the fiber. Reference fiber 206 is placed on the bottom of cylinder 262 and not affected by the pressure. Thus, the fiber does not change the polarization that allows subtracting ambient effects, such as temperature variation. The fibers optically coupled to fiber-optical connectors 265, 266, 267 and 268.

Flow Rate Sensor Embodiment

Figure 8:
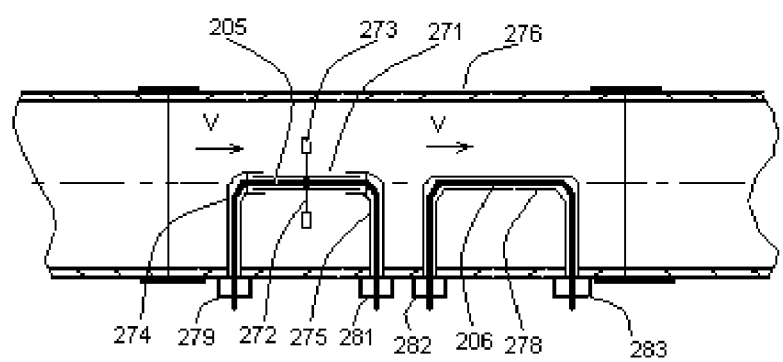
FIG. 8 depicts an embodiment of the invention for measuring flow rate.

To sense gas and liquid flow rate, the invention can be embodied as depicted in FIG. 8. In this embodiment, the measured pressure is transformed into twisting stress of sensing optical fiber 205 by air screw 271 mounted on movable tube 272 and containing number of blades 273. Tube 271 can axially rotate against not movable tubes 274 and 275 firmly fastened on a wall of pipe section 276. Fiber 205 is fixed by epoxy resin or another adhesive in the middle point of tube 271 and end points of tubes 274 and 275. Thus, fiber 205 can be twisted when tube 271 axially rotates against tubes 274 and 275. Pipe section 276 is connected to monitored pipeline in such a way that all measured flow passes this pipe section. Gas or liquid flow passing the pipe section interacts with air screw 271 producing momentum of rotation, which axially turns tube 271 until resistance of fiber 205 stops this turn. Thus, fiber 205 is twisted proportionally to flow speed V so changing polarization of the light passing the fiber. Reference fiber 206 is placed in U-shaped tube 278 that is mounted downstream in pipe section 275 that allows subtracting ambient effects, such as temperature variation. Both, sensing and reference fibers are optically coupled to fiber-optical connectors 279, 280, 281 and 282.

Figure 9:
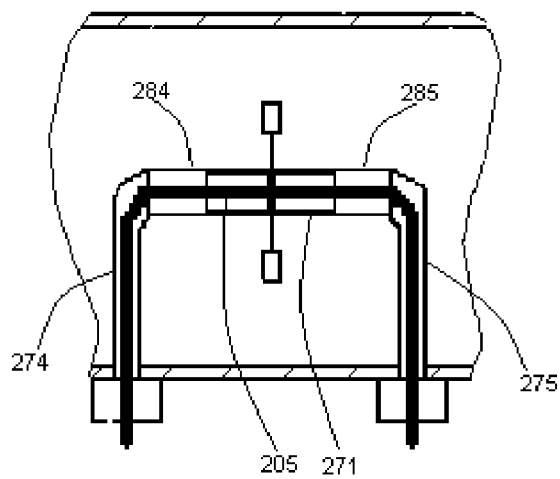
FIG. 9 depicts an embodiment of the invention for measuring high flow rates.

Another embodiment of the flow rate sensor is shown on FIG. 9. In this embodiment, tube 271 is joined to tubes 274 and 275 by sealed cylindrical membranes 284 and 285 that have less rigidity than tube 271 so providing possibility of tube 271 axial turn against tubes 274 and 275. The membranes may be made from metal or plastic materials providing necessary rigidity. The sensor of this embodiment may measure higher flow rates in comparison with the previous embodiment, where it is limited by rigidity of fiber 205, and, also, provides protection of the fiber 205 in aggressive environments.

Micro-Force Sensor Embodiment

Figure 10:
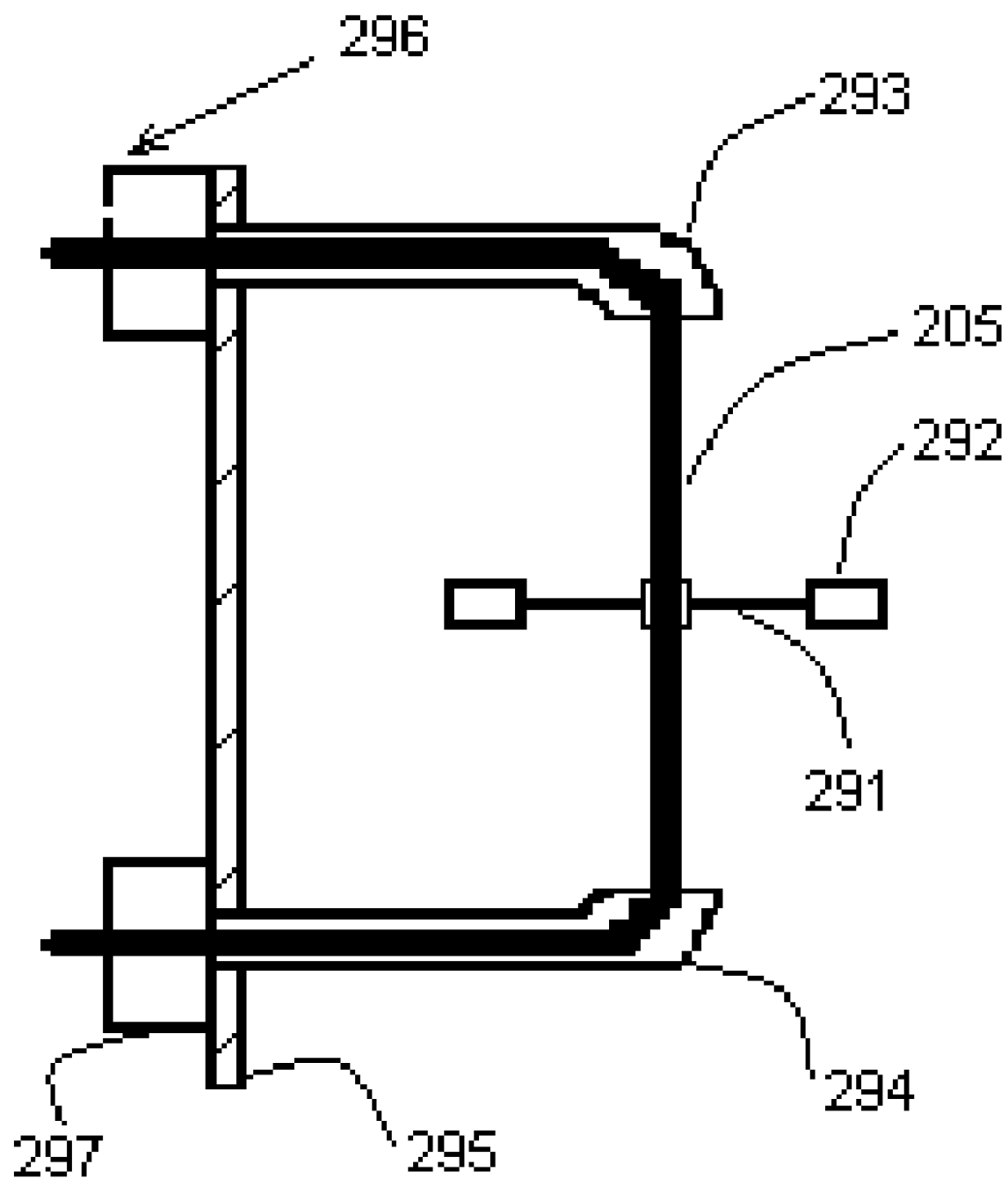
FIG. 10 depicts an embodiment of the invention for measuring micro-forces.

To sense low forces produced by such phenomena as electric or magnetic field, light pressure and others that scientific laboratories deal with, the invention can be embodied as depicted in FIG. 10. In this embodiment, the measured force is transformed into twisting stress of sensing optical fiber 205. The force perpendicularly applied to plane of blade 292 axially turns fiber 205 until resistance of the fiber stops it. Thus, fiber 205 is twisted proportionally to applied force so changing polarization of the light passing the fiber. The fiber input and output are placed in sealed tubes 293 and 294, and optically coupled to fiber-optical connectors 296 and 297. Fiber 205 can be laminated to protect the fiber in aggressive environments.

In all the illustrated embodiments, the photoelastic sensing module is designated by the numeral 200 and electro-optical module is designated by the numeral 100. In all the embodiments, the two fibers are preferably made of the same single mode or graded-index multimode optical fiber and are of the same length so that their properties are matched.

From the foregoing exposition, those skilled in the polarametric stress sensing art will recognize that the invention can be embodied in forms different from those described in the foregoing exposition. Therefore, it is intended that this invention not be limited only to the embodiments shown or described in this specification. Rather, it is intended that the scope of this invention be construed in accordance with the appended claims.

What is claimed is:

1. A fiber optic strain sensor comprising:
   a length of an optical fiber having an input end and an output end;
   a first fiber-optical connector optically coupled to said input end and a second fiber-optical connector optically coupled to said output end;
   a mechanical transducer converting a measured phenomenon into mechanical movement or force that is in proportion with said measured phenomenon, wherein said transducer applies force on a portion of said fiber that induces corresponding strain in said fiber, which provides polarization conversion of a single-mode light passed said optical fiber;
   wherein the improvement comprises:
   a second length of optical fiber being proximately located to said first length of optical fiber and having an input end and an output end, wherein said first length of optic fiber and said second length of optic fiber are single-mode ones; and, when strain sensor is mechanically strained, said first length of optical fiber realizes said corresponding compressing or twisting strain, whereas said second length of optical fiber does not realize said corresponding strain;
   a first fiber-optical polarization analyzer having an input and an output, wherein said input of said analyzer is optically coupled to output end of said length of optical fiber; and said output of said analyzer optically coupled to said second fiber-optical connector;
   a second fiber-optical polarization analyzer having an input and an output, wherein said input is optically coupled to output end of said second optical fiber;
   a third fiber-optical connector being optically coupled to said output of said second fiber-optical polarization analyzer;
   a polarization-maintaining fiber-optical splitter having a single input, a first output and a second output, wherein said single input of said splitter is optically coupled to said first fiber-optical connector, and said first output of said splitter is optically coupled to said input end of said first fiber;
   a fourth fiber-optical connector optically coupling said input end of said second single-mode optical fiber with said second output of said splitter, wherein said fourth connector comprises an input part and an output part that have ability of axial rotation about each other; therefore, polarization plane of light coming from said second output of said splitter can be turned to align polarization planes of light coming from said first and said second lengths of single-mode optical fibers; said polarization alignment provides initial setup of said sensor—equal amplitude of optical signal on said second and third fiber-optical connectors in the condition when measured parameter is not applied.

2. A strain sensor data acquisition system comprising:
   a polarization-maintaining single-mode fiber optic light source;
   a single polarization-maintaining fiber-optical line having an input end and an output end, wherein said input end is optically coupled to said light source;
   a polarization-maintaining splitter having a single input and one or more outputs, wherein said single input of said splitter is optically coupled to said output end of said single polarization-maintaining fiber-optical line;
   one or more of polarization-maintaining fiber-optical lines having an input end and an output end, wherein each said input end of said fiber-optical lines is optically coupled to one of said outputs of said polarization-maintaining splitter;
   one or more strain sensors of claim 1, wherein output end of each said polarization-maintaining fiber-optical line is exclusively dedicated to and in optical connection with the first optical connector of one of said sensors; said connection provides optical communication of said sensor with said fiber optic light source via said optical lines and said splitter;
   one or more sets of output single-mode fiber-optical lines containing two lines each—a first line and a second line having an input and an output end each; and each said set of two lines is exclusively dedicated to and in optical connection with one of said sensors, wherein input end of the first line of said set is connected to the second optical connector of said sensor and input end of the second line of said set is connected to the third optical connectors of said sensor;
   one or more sets of fiber optic detectors containing two said detectors each—a first detector and a second detector having single input each; and each said set of two detectors is exclusively dedicated to and in optical communication with said sensor via said sets of output single-mode fiber-optical lines, wherein input of first detector of said set of detectors is connected to output end of the first optical line of said set of output single-mode fiber-optical lines and input of the second detector of said set of detectors is connected to output end of the second optical line of said set of output single-mode fiber-optical lines; therefore, when said sensor is affected by the measured phenomenon, the first length of optical fiber of the sensor realizes corresponding compressive or twisting stress that rotates angle of polarization of linear-polarized light delivered to the sensor via said polarization-maintaining optical lines and polarization-maintaining splitter; the first fiber-optical polarization analyzer incorporated in the sensor transforms said rotation of polarization angle into amplitude modulation of the light that is further delivered to said optic detectors via said output single-mode fiber-optical lines; the second length of optic fiber of the sensor is not affected by the measured phenomenon and does not disturb the polarization, so optical signal passed the second length of fiber and second polarization analyzer is not affected by the measured phenomenon and reflects disturbances caused by ambient conditions only;

therefore, said second length of fiber is used as a reference one to compensate ambient condition variations;

and a processor responsive to said detectors, wherein said processor receives electrical signals coming from said first and second detectors of said set of two detectors and transforms said signals into reading of the measured phenomenon.

3. The strain sensor data acquisition system of claim 2, further comprising:

a multi-channel fiber-optical switch having single output and number of inputs equal to number of said output fiber-optical lines, wherein said switch inputs are optically coupled to said output fiber-optical lines;

a single single-mode fiber-optical line having an input end and an output end, wherein said single output of said switch is optically coupled to said input end of said single single-mode fiber-optical line; and a single optic detector having a single input that is optically coupled to said output end of said single single-mode fiber-optical line, wherein said fiber-optical switch sequentially connects each said output optic lines to said single fiber-optical line; said connection provides communication between each sensor and said single optic detector.

4. The sensor of claim 1, wherein said mechanical transducer modified to measure a structural strain comprises:

a vise having a groove where said first optic fiber is fixedly mounted;

a number of screws and springs, wherein said screws and springs tighten said vise to produce initial permanent compressive stress on said first fiber;

an adhesive fixedly mounting said vise to the area of interest, wherein said vise affected by the same strains as the structure transfers the strain to said fiber increasing or decreasing the initial compressive stress on said first fiber.

5. The sensor of claim 1, wherein said mechanical transducer modified to measure a gas or liquid pressure comprises:

a first and second coaxial cylinders having axial air gap between bottoms of said first and second cylinders, wherein internal volume of said first cylinder is under measured pressure and said second cylinders has openings to outside atmosphere;

a membrane to hold said first and second cylinders coaxially against each other;

a spring, which being fixed on bottom of said second cylinder provides permanent radial compressing of said first optical fiber fixedly mounted on bottom of said first cylinder, wherein deformation of said first cylinder caused by measured pressure additionally compresses said first optical fiber transforming the measured pressure into compressive stress of said first optic fiber.

6. The sensor of claim 1, wherein said mechanical transducer modified to measure a gas or liquid pressure comprises:

a first circular cylinder;

a second elliptical cylinder being coaxially arranged against said first cylinder and axially twisted;

a membrane to hold said first and second cylinders coaxially against each other;

an axial air gap between bottoms of said first and second cylinders, wherein internal volume of said second cylinder is under measured pressure and said second cylinders has openings to outside atmosphere;

two holders mounted on bottoms of said first cylinder and said second cylinder that fixedly hold ends of said first optical fiber, wherein, when internal volume of said second cylinder is under measured pressure, it starts axially twisting in the opposite direction to the initial twisting; said cylinder twisting transforms measured pressure into twisting stress of said first optic fiber.

7. The sensor of claim 1, wherein said mechanical transducer modified to measure an acceleration and vibration comprises:

a ball constructed from magnetically soft material, such as permalloy;

a first cylinder constructed from diamagnetic material and having hemispherical concave pattern;

a ring permanent magnet axially polarized and mounted on said first cylinder, wherein, when said ball placed in the pattern of said cylinder, said magnet attracts said ball;

two holes machined in said first cylinder in which said first optic fiber inserted to be in mechanical contact with said ball, wherein, when said ball is attracted by said magnet, length of said first fiber that is in contact with said ball is permanently compressed by said ball, and when the sensor is under acceleration or vibration, said ball compress said first fiber increasing or decreasing the initial compressive stress on said first fiber;

a second cylinder constructed from diamagnetic material and having hemispherical concave pattern, wherein said second cylinder is the lid covering said ball.

8. The acceleration and vibration sensor of claim 7, wherein the first cylinder of claim 7 has six holes in which three optic fibers similar to the first optic fiber of claim 7 are inserted; the middle of section of each of said optic fiber is in mechanical contact with the ball of claim 7, and radii of said ball, where said ball touches said optic fibers, form three-dimensional orthogonal axes so allow measuring three-dimensional vector of the acceleration or vibration.

9. The sensor of claim 1, wherein said mechanical transducer modified to measure a flow rate of liquids and gases comprising:

a pipe section having input end and output end, wherein said pipe section is installed in pipeline sequentially and all measured flow passes said pipe section;

two holders installed in said input and output ends of said pipe section, wherein the first optic fiber is firmly fastened between said holders and axially arranged with said pipe section; and two or more twisted blades firmly fastened at the middle of length of said first optic fiber;

said blades are perpendicular to said fiber and work as an air screw twisting said optic fiber by torque produced by said measured flow, wherein the twisting stress applied on said fiber is in proportion with the measured flow rate.

10. The flow rate sensor of claim 9 that to protect the optic fiber from aggressive medium further comprising:

a tube having input and output ends, wherein said blades are firmly fastened at the middle of said tube;

two low rigidity membranes connecting ends of said tube to said holders that allows axial turning of said tube against said holders, wherein said first optic fiber is inserted in said tube and fixed by an adhesive at holders and at the middle of said tube.

* * * * *